United States Patent
Lu et al.

(10) Patent No.: US 7,570,333 B2
(45) Date of Patent: Aug. 4, 2009

(54) METHOD AND SYSTEM FOR IMPROVING ION BEAM ALIGNMENT FOR LIQUID CRYSTAL DISPLAYS BY A GROOVING UNDER LAYER

(75) Inventors: Minhua Lu, Mohegan Lake, NY (US); Kei-Hsiung Yang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 10/697,760

(22) Filed: Oct. 30, 2003

(65) Prior Publication Data

US 2005/0094072 A1    May 5, 2005

(51) Int. Cl.
G02F 1/1337    (2006.01)
(52) U.S. Cl. .................. 349/132; 349/123; 349/128
(58) Field of Classification Search ................ 349/123, 349/124, 158, 125, 130, 128, 132
See application file for complete search history.

(56) References Cited

U.S. PATENT DOCUMENTS

| | | | | |
|---|---|---|---|---|
| 5,438,421 | A | * | 8/1995 | Sugawara et al. ........... 349/123 |
| 5,710,608 | A | * | 1/1998 | Nakabayashi et al. ....... 349/125 |
| 5,917,570 | A | * | 6/1999 | Bryan-Brown et al. ...... 349/129 |
| 6,020,946 | A | * | 2/2000 | Callegari et al. ............ 349/124 |
| 6,124,914 | A | | 9/2000 | Chaudhari et al. |
| 6,195,146 | B1 | | 2/2001 | Chaudhari et al. |
| 6,346,975 | B2 | | 2/2002 | Chaudhari et al. |
| 6,466,296 | B1 | | 10/2002 | Yamada et al. |
| 6,577,365 | B1 | | 6/2003 | Chaudhari et al. |
| 2002/0063830 | A1 | | 5/2002 | Callegari et al. |
| 2002/0186336 | A1 | | 12/2002 | Andry et al. |

FOREIGN PATENT DOCUMENTS

| | | | |
|---|---|---|---|
| JP | 55166625 | * | 12/1980 |
| JP | 56138716 | * | 10/1981 |
| JP | 11-237638 | * | 8/1999 |
| JP | 8-114804 A | | 10/2006 |

OTHER PUBLICATIONS

P. Chaudhari, et al., "Atomic-beam alignment of inorganic materials for liquid-crystal displays", 2001 Macmillan Magazines Ltd, Nature, vol. 411, May 3, 2001, pp. 56-58.

* cited by examiner

Primary Examiner—Julie Ngo
(74) Attorney, Agent, or Firm—Scully, Scott, Murphy & Presser, P.C.; Daniel P. Morris, Esq.

(57) ABSTRACT

A liquid crystal display (LCD) device comprises a first substrate having a grooved surface profile; an alignment film layer of inorganic material formed on the grooved surface and having the grooved surface profile, the alignment film of inorganic material being aligned in response to an ion beam incident to the grooved surface in a direction parallel to a groove direction; a second substrate aligned opposite the first substrate for forming a plurality of LCD cells having liquid crystal (LC) material deposited therein, wherein LC molecules align parallel to the grooves for enhanced LCD performance.

9 Claims, 6 Drawing Sheets

METHOD AND SYSTEM FOR IMPROVING ION BEAM ALIGNMENT FOR LIQUID CRYSTAL DISPLAYS BY A GROOVING UNDER LAYER

BACKGROUND OF THE INVENTION

1. Field of the Invention

The present invention relates generally to the field of Liquid Crystal Display (LCD) devices, and more specifically to a method and system for improving technology for aligning the backplane (substrate) surface for enhancing alignment of the liquid crystal.

2. Description of the Prior Art

In past 20 years, liquid crystal display has grown in to multi billion dollar industry and products implementing LCD device can now be found in hand held devices, small size color televisions, laptop computers, and projection systems, and LCDs are increasingly being used for desktop computers.

One conventional LCD device includes liquid crystal cells having liquid crystal sandwiched between transparent electrodes formed on opposed glass substrates (i.e., plates) Another conventional LCD device includes liquid crystal cells having liquid crystal sandwiched between a transparent electrode on glass substrate and a reflective electrode on a non-transparent or transparent substrate (e.g., silicon). In either case, an electrical signal is selectively applied between the electrodes to allow the device to modulate incident light and display information. To obtain contrast, the orientation of the liquid crystal molecules must be uniformly controlled. In a field effect system such as a nematic system (which is designed to twist the liquid crystal molecules by about 0° degrees to 270° degree between the upper and lower plates), it is preferable to orient the liquid crystal molecules parallel to the substrate surface in a unidirectional manner. The liquid crystals can be aligned through stretching a polymer, rubbing a polymer, depositing a polymer in the form of a Langmuir Blodgett film, or exposing a polymer film to UV radiation. Additionally, alignment can be achieved by depositing $SiO_x$ on substrates or by etching grooves using microlithography.

One popular alignment technique is to deposit a polyimide alignment (PI) film on each transparent electrode to orient the liquid crystal, and then to rub or abrade the polyimide film in a desired direction. More specifically, a polyimide film is formed by applying a wet coat of polyimide solution to a substrate using known printing or spinning techniques. The wet coat is baked to form a polyimide film on the substrate. After the polyimide film is formed on the substrate, the molecular structure of the film must be aligned in a desired direction in order to orient the liquid crystal molecules in the desired direction. For this purpose, the polyimide film is rubbed in the desired direction with a gigged, flocked, or velvet cloth, and then cleaned to remove debris from the rubbing. In this manner, an alignment film is formed as an insulating layer with an atomic structure aligned so as to orient the liquid crystal molecules in the desired direction.

Rubbing the polyimide alignment film by cloth is still the standard method in multibillion dollar state of art fabrication facilities. However, this polyimide rubbing method produces debris, causes ESD damages, and requires after rubbing cleaning.

Non-rubbing alignment technology is now a hot research topic in the LCD industry as well as in universities. The present assignee International Business Machines Corporation (Armonk, N.Y.) has protected technology implementing low energy ion beam (IB) treatment of inorganic films such as diamond like carbon films to align liquid crystals. For instance, U.S. Pat. Nos. 6,195,146, 6,124,914, 6,346,975 and 6,577,365 each describe methods implementing ion beam bombardment of the alignment layers.

Comparing to the other non-rubbing alignment methods such as photo-treatment of organic thin films, the ion beam treatment on diamond-like film (DLC) or other inorganic thin films for the alignment of liquid crystals has the advantages of dry film deposition, non contact alignment process, short process time and reduced processing steps. The alignment by ion beam treatment on DLC film abbreviated as DLC IB alignment is more uniform and has less image-sticking than conventional rubbed-PI alignment. However, it is found that DLC alignment tends to have more disclinations, which is the defect where liquid crystal molecules tilt to different directions, associated with reverse twist domain than PI alignment. In addition, the azimuthal anchoring energy, which is the energy binding to liquid crystal molecules to certain orientation, of DLC alignment is weaker than PI alignment resulting in a deviation larger than $\pm 1°$ in the twist angle. The deviation in the twist angle should be less than about $\pm 1°$ for in-plane-switching (IPS) mode. Weak anchoring is also a potential problem for long term reliability. Further more, DLC alignment has a meta-stable alignment state that is perpendicular to the IB direction. Particularly, LC molecules tend to align perpendicular to the IB direction on such DLC surfaces. The meta-stable state is part of the reason for existence of reverse twist domains.

It would thus be highly desirable to provide a system and method implemented in LCD display manufacture that enhances the alignment of the liquid crystal material using diamond-like film (DLC) or other inorganic thin alignment layers.

While provision of grooves for liquid crystal (LC) alignment is one of the oldest liquid crystal alignment methods (See for example, U.S. Pat. Nos. 5,438,421, 6,466,296) usually it has a low anchoring energy and is difficult to produce which is why polyimide rubbing is the preferred industry standard.

It is believed that there has heretofore never been an LCD alignment technique that utilizes the provision of grooves in DLC or other inorganic thin alignment layers for enhancing the alignment of the liquid crystal material.

SUMMARY OF THE INVENTION

According to one aspect of the invention, a system and method implemented in LCD display manufacture that enhances the alignment of the liquid crystal material using diamond-like film (DLC) or other inorganic thin alignment layers subject to ion beam (IB) treatment.

According to another aspect of the invention, a system and method is provided that implements a grooved surface under the DLC or other inorganic thin alignment layer with grooving direction parallel to the IB direction to enhance the alignment of the liquid crystal.

Thus, according to the invention, grooves are introduced to the DLC or other inorganic thin alignment layer to help increase anchoring strength (i.e., how strong the molecules are anchored to a specific direction) and improve reliability. Particularly, the effect of the introduced grooves are two fold: 1) it increases the surface area in contact with the LC to increase the total surface anchoring energy; and, 2) it enhances a topological un-symmetry between IB direction and perpendicular to IB direction, so that the alignment other than along the grooves or IB direction is energetically unfavorable. Therefore, the grooves will generate additional alignment force or anchoring to constrain the LC molecules to the desired direction. The problems caused by weak anchoring and 90 degree meta-stable state can thus be avoided.

There is thus provided a liquid crystal display (LCD) device and method for forming the device that comprises: a first substrate having a grooved surface profile; an alignment film layer of inorganic material formed on the grooved surface and having the grooved surface profile, the alignment film of inorganic material being aligned in response to an ion beam incident to the grooved surface in a direction parallel to a groove direction; a second substrate aligned opposite the first substrate for forming a plurality of LCD cells having liquid crystal (LC) material deposited therein, wherein LC molecules align parallel to the grooves for enhanced LCD performance.

Advantageously, the system and method of the present invention may be applicable for transmissive and reflective LCD displays.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
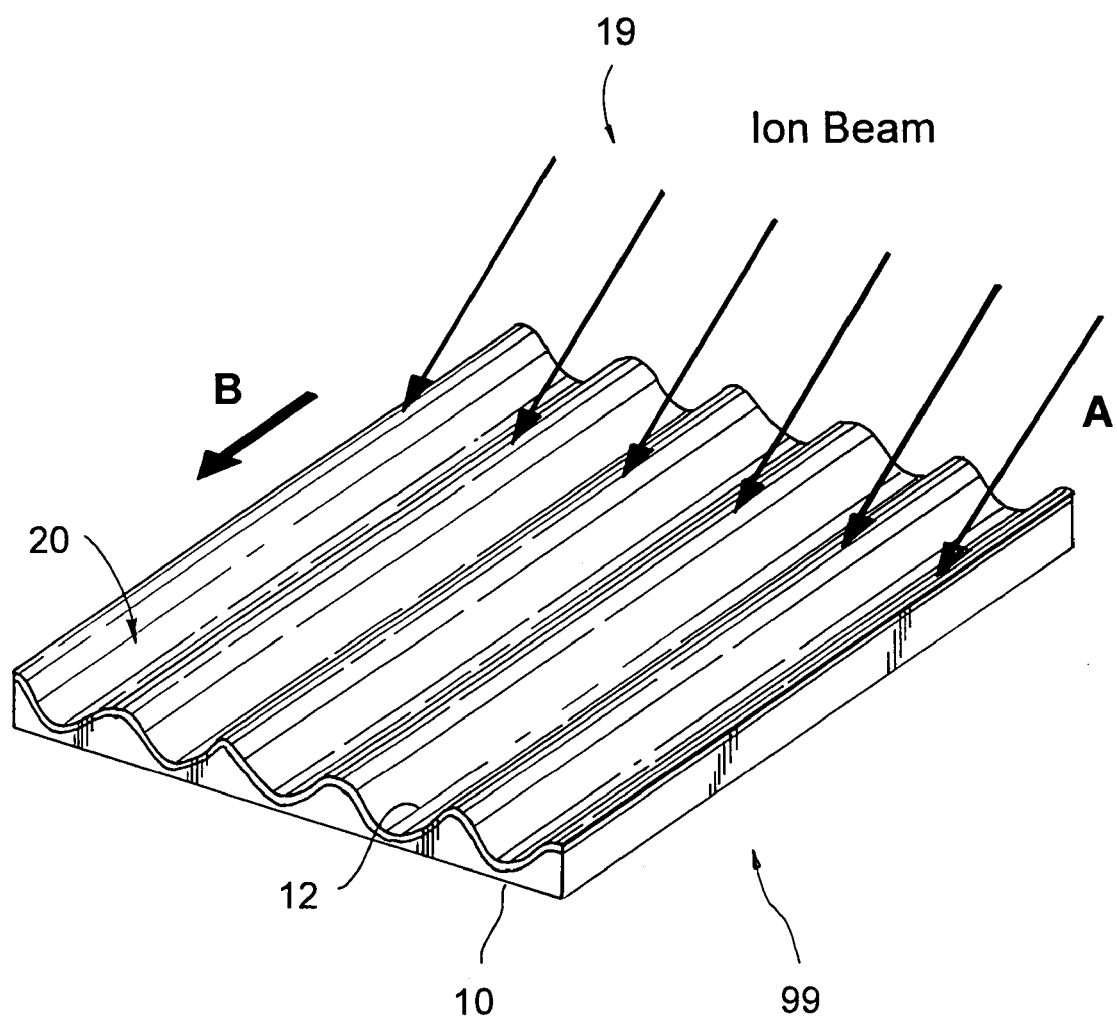
FIG. 1 illustrates a LCD display substrate having a grooved surface and the direction of ion beam impingement according to the invention.
Figure 2:
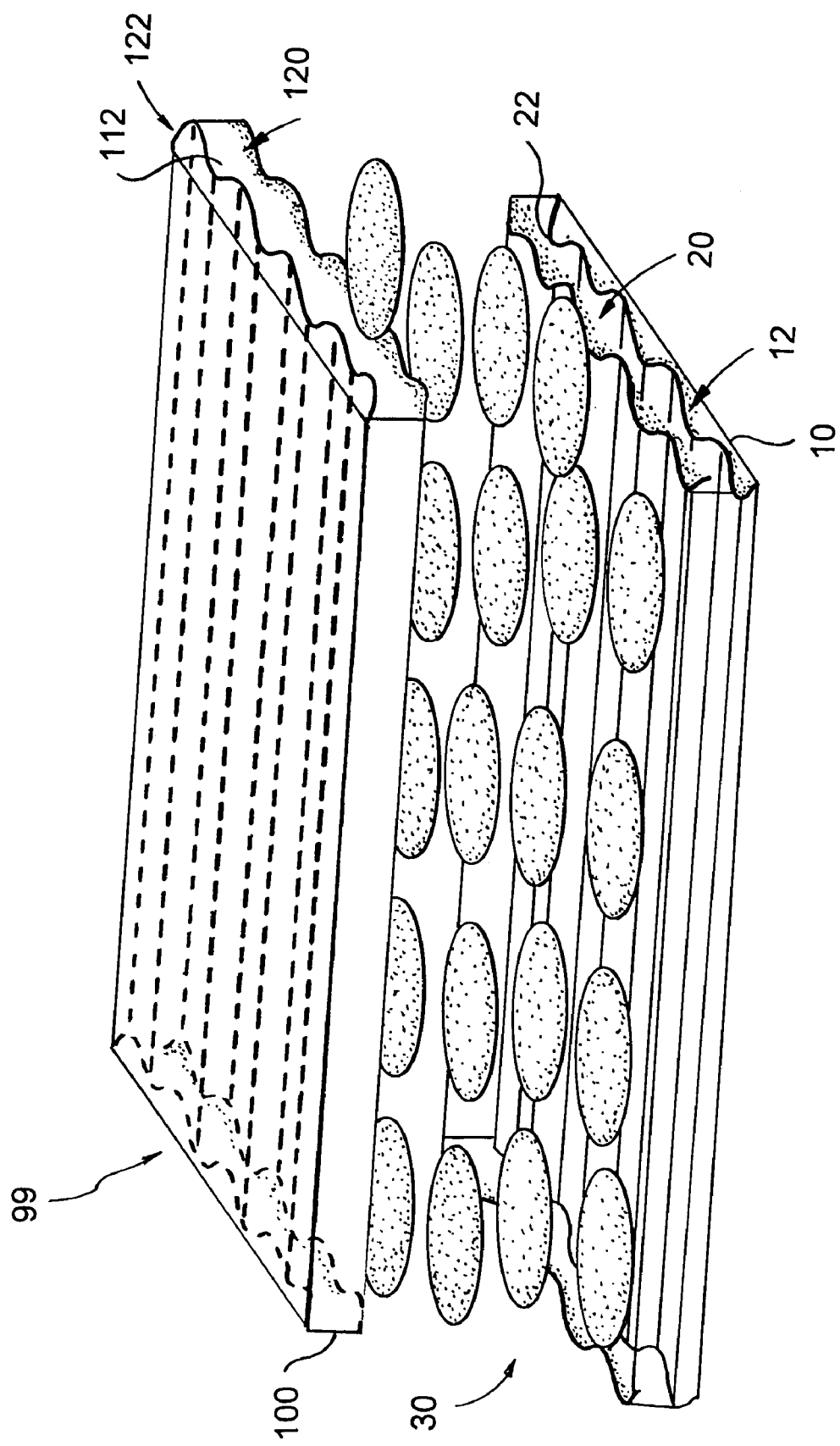
FIG. 2 illustrates a LCD device 99 with a grooved under-layer surface according to an embodiment of the invention.

FIGS. 1 and 2 illustrate a LCD display device 99 including a substrate 10 having a grooved surface 12 and indicating a direction of ion beam impingement 15 according to the invention. In the preferred embodiment, a hydrogenated diamond-like carbon (DLC) alignment film 20 is coated on the grooved surface. As shown in FIG. 1, the ion beam (IB) 19 incident direction indicated by arrow A, is parallel to the groove length direction indicated by arrow B.

Figure 4:
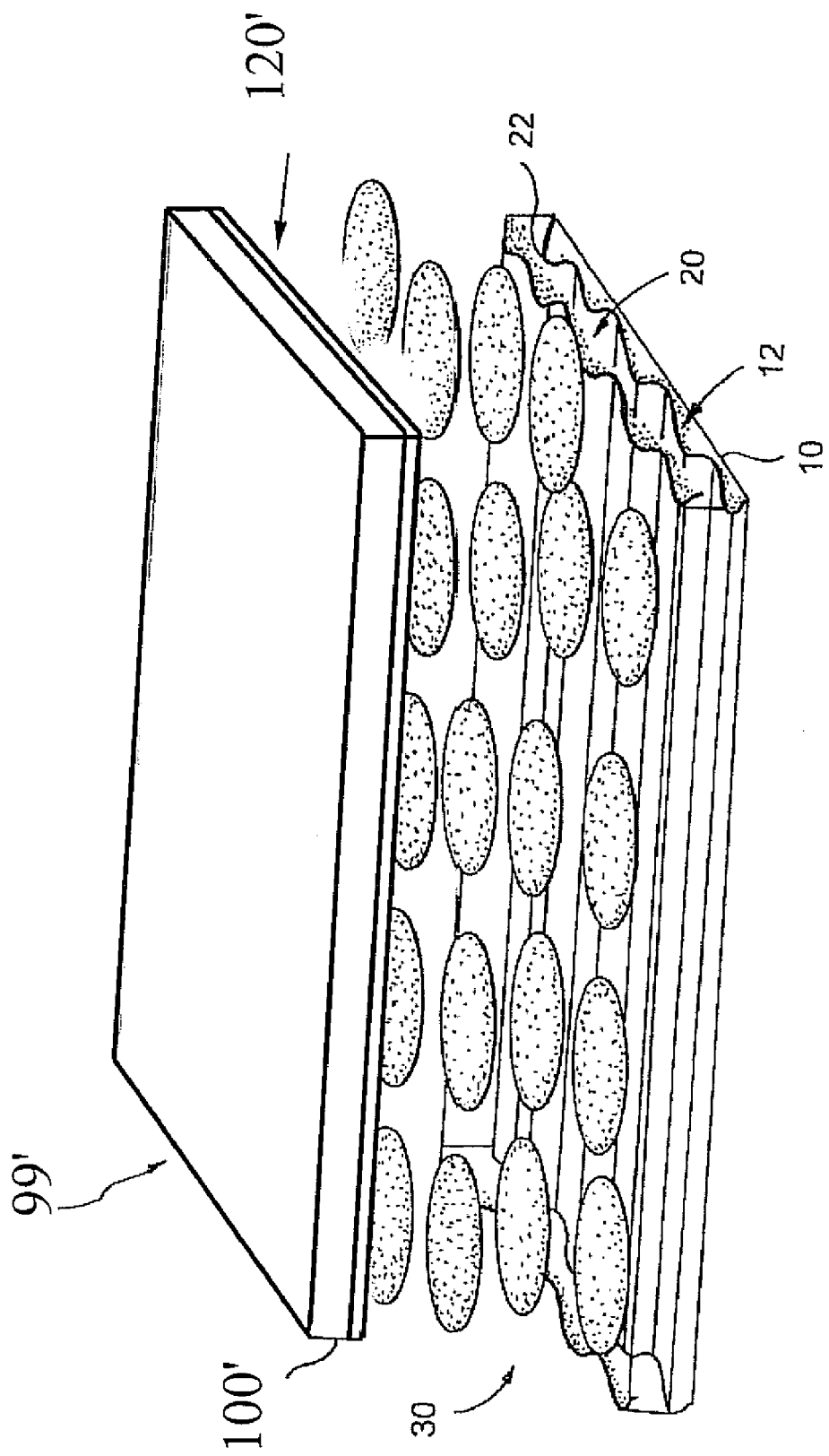
FIG. 4 illustrates an LCD device 99' including a top over-layer substrate 100' having a flat surface profile and flat alignment film layer 120' formed thereon according to an alternate embodiment of the invention.

In the embodiment depicted in FIG. 2 (or FIG. 4 as discussed below), the grooved-surface 12 has a sinusoidal profile 22 in only a single direction. Given a sinusoid period of about 1.0 µm and the amplitude of about 0.3 µm, the surface area for the sinusoidal grooved-surface is 1.67 times surface of a flat surface. For a given surface anchoring energy, the total surface energy of a grooved surface is about 60% higher than a flat surface. FIG. 2 depicts the LCD device 99 with a grooved under-layer surface 12 having a sinusoidal profile 22 and a DLC or inorganic material layer alignment film 20, and additionally an over-layer substrate 100 is shown provided having a grooved-surface 112 of a sinusoidal profile 122 and includes a DLC or inorganic material layer alignment film 120. It is understood thus, that an LCD device 99 of the invention may include bottom and top substrates that both have grooved surfaces and DLC or inorganic material layer alignment films 20, 120, or, have one surface (top or bottom) that may be grooved with a DLC or inorganic layer alignment film. For instance, FIG. 4 illustrates an LCD device 99' including a top over-layer substrate 100' having a flat surface profile and flat alignment film layer 120' formed thereon according to an alternate embodiment of the invention. Besides DLC, other inorganic material layer alignment films include $SiN_x$, hydrogenated amorphous silicon, SiC, $SiO_2$, glass, $Al_2O_3$, $CeO_2$, $SnO_2$, $ZnTiO_2$, $InTiO_2$, $InZnO_2$, and other organic or inorganic dielectric materials and conducting materials.

Figure 6:
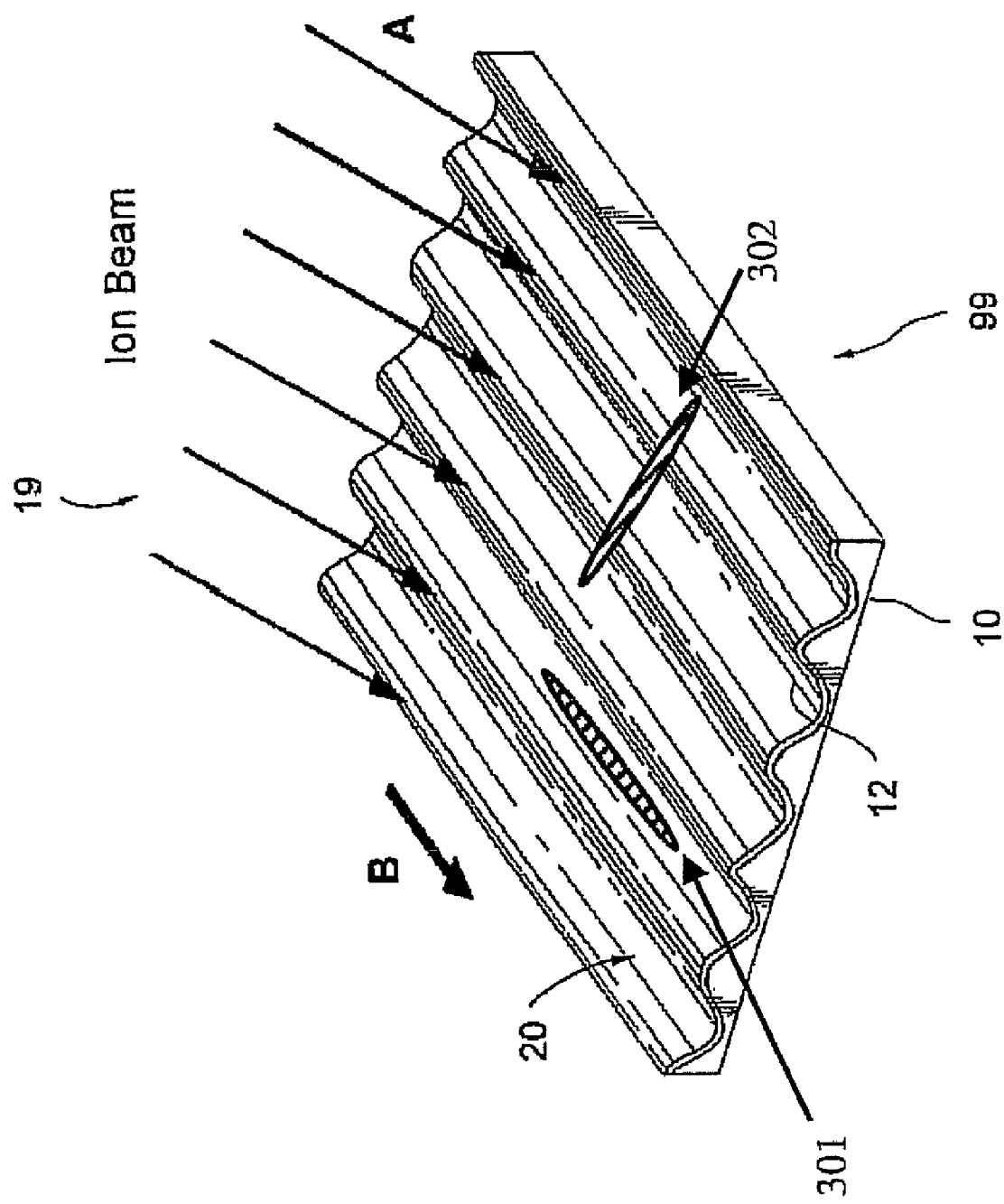

As shown in FIG. 2, the effect of providing a grooved surface 12 is that the liquid crystal (LC) molecules 30 align parallel to the grooves (i.e., an axial groove aligned state) rather than perpendicular to the grooves (i.e., a 90-deg meta-stable alignment state) because the latter alignment requires a higher free energy than the former. For the example embodiment depicted in FIG. 2, the calculated energy for molecules to align perpendicular to the grooves is approximately 3.4 times higher than that for the molecules to align parallel to the grooves. To illustrate, FIG. 6 depicts an LC D molecule 301 sitting inside a groove alignment layer in a direction parallel to the ion beam bombardment direction parallel to the grooves, the molecule having a lower potential energy than molecule 302 that is sitting on a ridge of the groove (i.e., the 90-deg meta-stable alignment state).

Based on this energy argument, the alignment on the grooved surface is more stable than on a flat surface. In a study comparing the surface effect on 90-deg meta-stable state in IB DLC alignment between rubbed polyimides, IB DLC alignment on flat surfaces and the IB DLC alignment with grooved under-layer created either by rubbing the substrate as well as rubbed PI under-layer, the results show that 90-deg meta-stable state does not exist on rubbed PI samples. On the IB DLC with rubbed substrate or grooved under-layer, the 90-meta-stable state disappears within 5 minutes. However, the 90-deg meta-stable state lasts days, even months on the regular IB DLC on flat surfaces. The experimental results indicated that the grooved surface is thus able to enhance the alignment along IB direction.

A method for forming the device of FIG. 2 is now described. First, formed on a flat substrate surface is the underlayer and DLC alignment layers. The alignment layer such as DLC film may be first deposited by plasma-enhanced chemical vapor deposition, for example, on glass substrates coated with a conducting indium tin oxide (ITO) film under-layer to a thickness of about 300 Å (300 Å to 1400 Å). The thickness of the underlayer is about 100 Å to 10 µm. The material can be conducting electrodes such as ITO and Al, or inorganic or organic dielectric materials. The underlayer can be deposited by sputtering, CVD or PECVD, spin coating, printing, stampling, molding, or langmuir blogetfilm coating. The method of forming grooves can be etching, direct deposition, oblique deposition, ion beam blasting, rubbing, printing, stamping, or molding. Other substrates, such as Si and quartz, may additionally be used.

It is understood that hydrogen content may be used in forming the DLC films. In one embodiment, for instance, C:H films may be deposited using $C_2H_2$/He and $H_2$ gas mixtures. Hydrogen may be added to the process to increase film transmittance. The hydrogen content of the films may be measured by forward recoil scattering, and a process matrix used to establish which process parameters yield higher hydrogen content and thus higher transmittance. In experiments, the substrates were held at room temperature, which is important for cost considerations and additionally help to obtain more transparent films than would a high-temperature process.

As an alternative to rubbing, which is the process to be eliminated according to the invention, there are many ways to produce the grooved surface. For example, grooves may be produced by photolithography, direct deposition at oblique angles, ion beam blasting, imprinting, stamping or even by dipping and pulling the substrate in the liquid glass or similar means. The grooved underlayer can be formed directly on the substrates by means such as oblique deposition, imprinting, stamping, dipping and pulling the substrates in liquid glass or other materials, and Langmuir Blodgett film deposition. If the surface of the underlayer is flat after deposition or coating, then additional process such as etching, IB blasting, or rubbing is needed to make grooves. The IB alignment can be done directly on the grooves underlayer (In this case the underlayer is also alignment layer) or on a alignment coated on top of the underlayer. While the grooved surface described hereinabove is sinusoidal, it is understood that different groove surface profiles are contemplated including, but not limited to: for example, triangular, rectangular, square, etc. Further, the grooves do not have to be continuous, and, in the preferred embodiment, the grooves may be terminated in length direction and restart in a slightly different location with different height and widths.

After depositing LC molecules, they are aligned by ion beam (IB) bombardment. Ion beams may be produced with a direct-current Kaufman-type ion source using a tungsten filament to supply electrons to the plasma and a plasma-bridge neutralizer to maintain charge neutrality. Argon or other inert gases (e.g., nitrogen, oxygen, hydrogen) may be introduced into the ion source and plasma-bridge neutralizer using separate gas-flow controllers. The plasma-bridge neutralizer has the advantage of reduced substrate contamination as it is not physically immersed in the ion beam. In contrast, the commonly used tungsten-filament neutralizer, which is placed directly in the ion beam, is subject to sputtering by the energetic argon ions and neutrals impinging on it. Ions with energies in the range of 100 eV-1000 eV were extracted for the plasma within the ion source and accelerated toward the substrate. Ion current densities were measured using biased Faraday-cup probes to repel low-energy electrons introduced into the beam by the plasma-bridge neutralizer.

Substrates may be mounted on a moving stage that is linearly scanned beneath the ion source. The tray speed was programmable, allowing different ion doses to be applied to the sample when using a fixed ion current density. The incident angle of the impinging ions may be varied by adjusting the angular position of the ion source relative to the substrate, however, are directed parallel to the grooved surface according to the invention.

Figure 3:
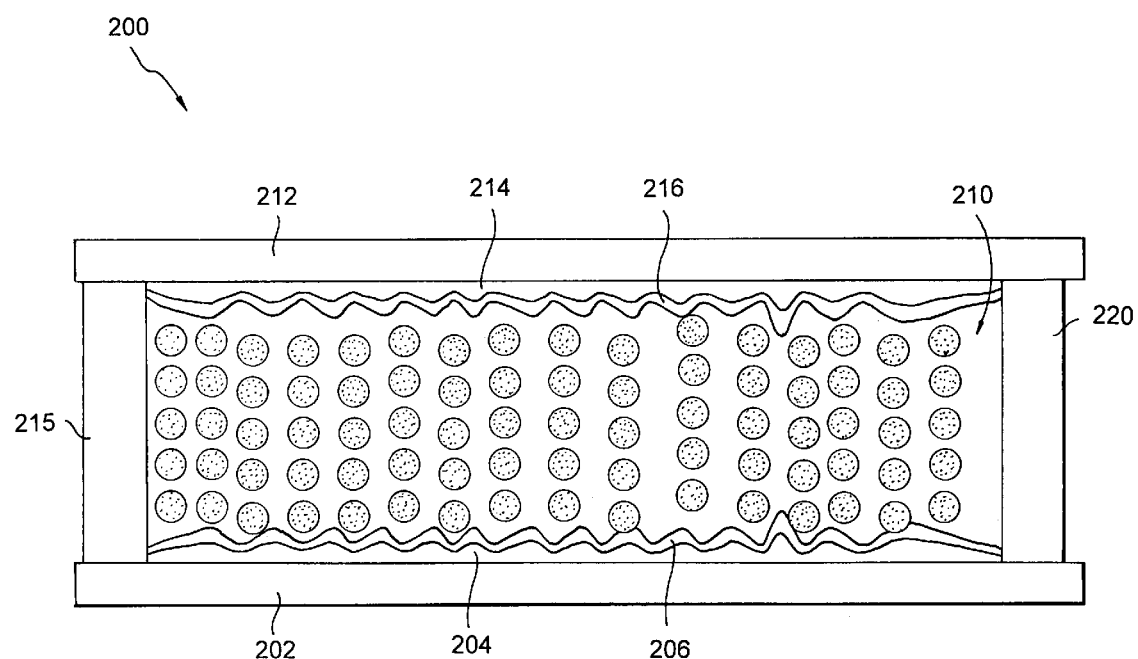
FIG. 3 illustrates a cross-sectional view of an LCD device manufactured according to the methodology of the present invention.

FIG. 3 illustrates a cross-section of the LCD device structure 200 having homogeneous alignment of LC molecules formed according to the method of the current invention. As shown in FIG. 3, the LCD device 200 includes a both top 212 and bottom 202 substrates, the bottom substrate 202 having formed therein a matrix of thin-film transistors (TFT) devices (not shown) having formed pixel electrodes for receiving the data signals associated with the individual pixels. The top substrate 212 may comprise electrode with or with out color filter elements. Associated and formed on each bottom, top substrate is a formed a respective grooved underlayer 204, 214 and a corresponding alignment layer 206, 216 formed thereon. In view of FIG. 3, corresponding alignment layer 206 and 216 both have a corresponding grooved surface profile as the underlying respective substrates 202, 212 upon which the alignment layers are formed. As shown in FIG. 3, the grooved underlayer and alignment layer is of a non-uniform profile. Deposited between the respective formed top and bottom substrate, underlayer and alignment layer structures are the liquid crystal molecules 210 which are shown uniformly oriented into the plane of the figure, in a manner parallel to the formed grooves of the underlayer and alignment layers. As shown in FIG. 3, portions of the device include a sealant material 215, 220 that is formed between the substrates according to known techniques for sealing the LC molecules between the two substrates.

Figure 5:
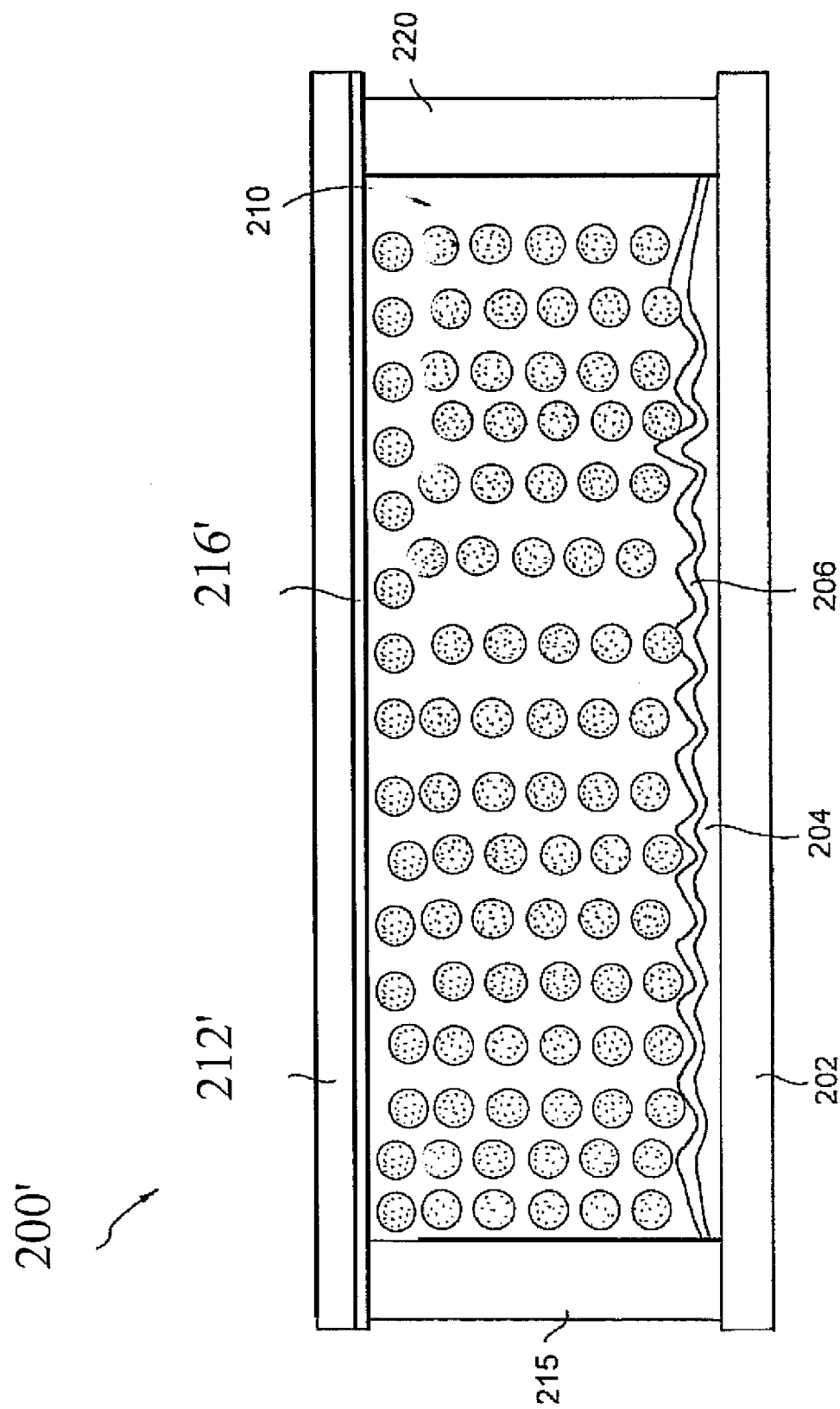
FIG. 5 illustrates a cross-sectional view of a portion of the alternate LCD device 200' corresponding to device 200 of FIG. 3, however, including the top over-layer substrate 212 and corresponding alignment layer 216' formed thereon having a flat surface profile in an alternate embodiment of The invention; and, FIG. 6 depicts an LCD molecule 301 sitting inside a groove alignment layer in a direction parallel to the ion beam bombardment direction parallel to The grooves, The molecule having a lower potential energy than molecule 302 That is sitting on a ridge of the groove.

FIG. 5 illustrates a cross-sectional view of a portion of the alternate LCD device 200' corresponding to device 200 of FIG. 3, however, including the top over-layer substrate 212 and corresponding alignment layer 216' formed thereon having a flat surface profile in an alternate embodiment of the invention.

As mentioned, according to the embodiment depicted in FIG. 3, and for best performance, the grooves formed in the alignment film and substrate surface, whether they form the under-layer, over-layer, or both in a LCD device, do not have a perfect periodic structure in order to avoid the diffraction effect. The dimension of the grooves are preferably on the order of the few micrometers (e.g., 0.2 μm-10 μm) and include a groove height ranging from about 100 Å to a few micrometers. Further, the grooves do not have to be continuous. That is, the grooves may be terminated in length direction and restart in a slightly different location with different height and width.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A liquid crystal display (LCD) device comprising:
a first substrate having a grooved surface profile;
a first alignment film layer of inorganic or organic material formed on said grooved surface of said first substrate and having said grooved surface profile, said first alignment film of inorganic or organic material having 90° meta-stable alignment states eliminated at the surface of said alignment film layer and having an increased alignment force for constraining deposited LC material to an alignment direction parallel to the grooves due to enhanced topographic un-symmetry so that alignment other than along the grooved surface profile is energetically unfavorable; and
a second substrate having a flat surface profile and a second alignment film layer formed thereon, said second substrate aligned opposite said first substrate for forming a plurality of LCD cells having said liquid crystal (LC) material deposited therein, said LC molecules aligning parallel to the alignment direction of said alignment film layer formed on said grooved surface of said first substrate, wherein aligning the LC molecules parallel to the grooves enables decreased potential energy of said LC material.

2. The LCD device according to claim 1, wherein said alignment film layer of inorganic or inorganic material is diamond-like carbon.

3. The LCD device according to claim 1, wherein a surface anchoring energy is increased as compared to LC material deposited between flat substrate surfaces due to an increased surface area in contact with the LC material.

4. The LCD device according to claim 1, wherein said a first and second alignment film comprises one selected from the group comprising: $SiN_x$, hydrogenated amorphous silicon, SiC, $SiO_2$, glass, $Al_2O_3$, $CeO_2$, $SnO_2$, $ZnTiO_2$, and $InTiO_2$, InZnO2, and other organic or inorganic dielectric film and conducting films.

5. The LCD device according to claim 1, wherein said grooved surface profile of said alignment film is grooved in a single direction only.

6. The LCD device according to claim 1, wherein said grooves are not continuous along a lengthwise direction.

7. The LCD device according to claim 6, wherein the grooves are terminated in a length direction and restart in a slightly different location lengthwise with different height and width of said grooves.

8. The LCD device according to claim 1, wherein said alignment film formed on said first substrate having said grooved surface profile is subjected to an incident ion beam in a direction parallel to a grooving direction to avoid weak anchoring and 90 degree meta-stable states in liquid crystal (LC) material resulting in said increased alignment force.

9. A liquid crystal display (LCD) device comprising:
a first substrate having a grooved surface profile;
a first alignment film layer of inorganic or organic material formed on said grooved surface of said first substrate and having said grooved surface profile, said first alignment film of inorganic or organic material having 90° meta-stable alignment states eliminated at the surface of said alignment film layer; and
a second substrate having a fiat surface profile and a second alignment film layer formed thereon, said second substrate aligned opposite said first substrate for forming a plurality of LCD cells having a liquid crystal (LC) material deposited therein, said LC material aligning parallel to the alignment direction of said alignment film layer formed on said grooved surface of said first substrate.

* * * * *